J. F. EDDY.
Plant-Duster.
No. 226,731. Patented April 20, 1880.
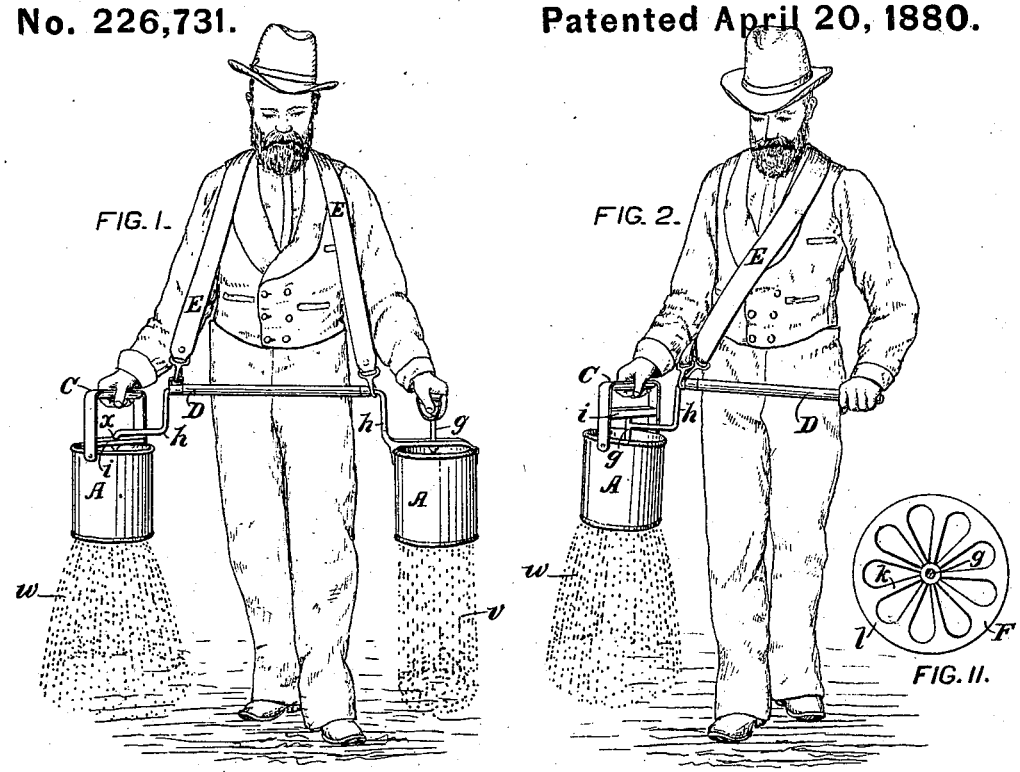
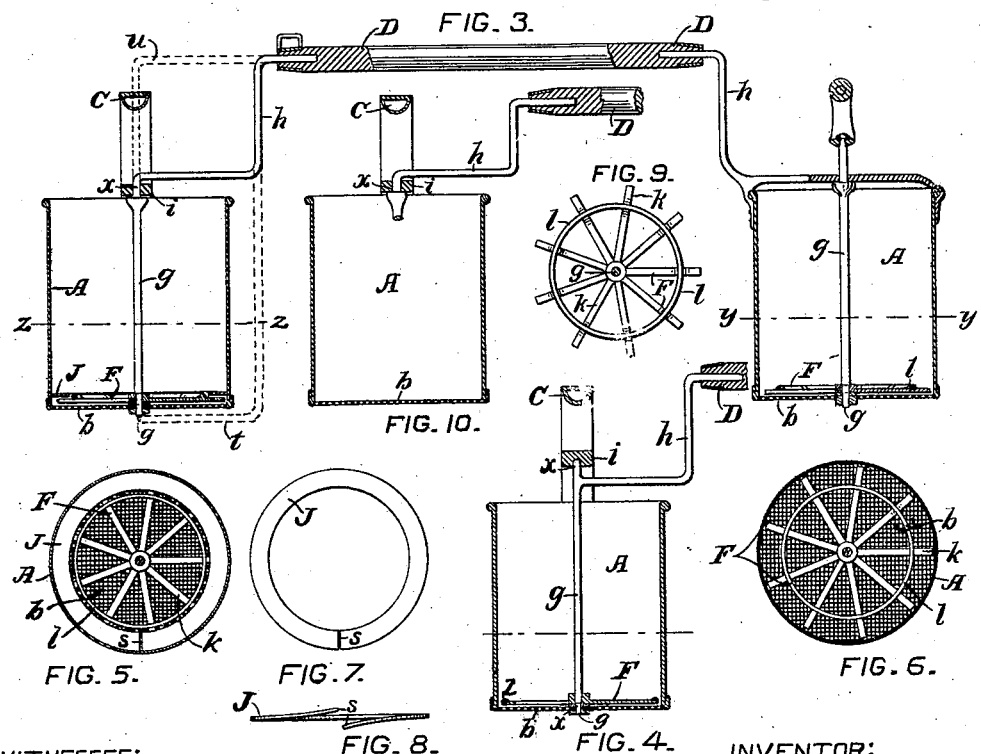
WITNESSES:
James H. Slade.
James T. Goodfellow.
INVENTOR:
John F. Eddy

UNITED STATES PATENT OFFICE.

JOHN F. EDDY, OF BRUNSWICK, (RAYMERTOWN P. O.,) NEW YORK.

PLANT-DUSTER.

SPECIFICATION forming part of Letters Patent No. 226,731, dated April 20, 1880.

Application filed August 5, 1879.

*To all whom it may concern:*

Be it known that I, JOHN F. EDDY, of the town of Brunswick, (Raymertown P. O.,) in the county of Rensselaer and State of New York, have invented certain new and useful Improvements in Plant-Dusters, of which the following is a specification, reference being had to the accompanying drawings.

The general object of this invention is to produce a very simple, durable, and effective device which a person can easily carry and conveniently use by hand in the field in rapidly and thoroughly sprinkling and dusting plaster, mixed plaster and paris-green, and other fertilizing and insect-poisoning substances in the form of dust or powder upon and about growing corn, potato, and other plants.

In the aforesaid drawings, like parts are marked by like letters in the different figures, and Figure 1 represents a person carrying and using a device which embodies this invention. Fig. 2 is a view of a person carrying and using a device which embodies a portion of the same invention. Fig. 3 is a sectional elevation, on a larger scale, of the device shown in Fig. 1, the suspension-strap being removed. Fig. 4 is a sectional elevation, some parts being broken away and removed, of the device shown in Fig. 2. Fig. 5 is a section at and plan of the parts below the line $z\ z$ in Fig. 3, and Fig. 6 is a section at the line $y\ y$ in Fig. 3 and plan of the parts below that line. Fig. 7 is a plan, and Fig. 8 an edge view, of a removable annular plate shown in Figs. 3 and 5. Fig. 9 is a plan of the clearer shown in Figs. 3, 5, and 6, and Fig. 10 is a sectional elevation of one of the plant-dusters without the clearer. Fig. 11 is a plan of the clearer shown in Fig. 4.

Some plant-dusters have been heretofore made with a pail-like vessel having a sieve-like bottom and a carrying-handle arranged centrally over and across the vessel and rigidly secured thereto, so that a person grasping the handle by one hand could thereby carry the vessel with ground plaster therein, and could sift out the plaster by twisting to and fro the wrist of the hand carrying the vessel, and thereby turning the vessel to and fro about its vertical axis. To walk in a furrow along a row of plants and carry such a sifting-vessel by its handle and thrust it out sidewise over the row of plants and then vibrate the vessel about its vertical axis in that thrust-out position all by one hand is a rather slow operation, and is very fatiguing to the hand, wrist, and arm of the person.

The design of my invention is to produce a device by means of which a person can easily distribute fertilizers, insect-destroyers, and other similar powdered substances upon plants arranged in hills or rows; and to this end it consists, principally, in the means employed for operating the sifting mechanism without obstruction of the discharge of the material being distributed, substantially as and for the purpose hereinafter specified.

It consists, further, in the means employed for regulating the lateral position of the plant-dusting device and enabling an additional vessel to be carried and operated by one person, substantially as is hereinafter shown.

It consists, finally, in the means employed for lessening the diameter of the outlet for the substance being distributed and correspondingly diminishing the transverse dimensions of the area operated upon, substantially as is hereinafter shown and described.

In the carrying out of my invention I combine with a suitable vessel, A, having a finely-perforated or sieve-like bottom, $b$, a handle, C, arranged centrally and horizontally, or nearly so, over the vessel, and another handle, D, extending laterally far beyond the vessel, and have the lateral handle D pivoted or jointed to said vessel, and the other handle, C, fastened thereto, so that a person can by one hand grasp the handle C, and thereby carry the vessel, and can at the same time, by the other hand, conveniently grasp the rod or handle D, and thereby easily thrust the vessel out sidewise over the plants, substantially as indicated in Fig. 2, and can then easily hold or keep the vessel in that position by the handle D, which is pivoted or jointed to the vessel, while the vessel can be turned to and fro about its vertical axis by the other handle, C, that is fastened to the vessel.

In Figs. 2, 4, and 10, and at the right in Figs. 1 and 3, the laterally-extending rod or handle D is pivoted to the vessel at X, and the carrying-handle C is so secured to the vessel that the latter can be turned to and fro about its vertical axis to sift out the dust-like substance through the perforated bottom b by properly turning the handle C to and fro horizontally about its center by one hand, while the rod or handle D can be held by the other hand, so as to keep the vessel in the proper position over the plants being dusted.

In order to greatly relieve the hands and arms of the person in carrying and operating the dusting device having the vessel A b and handles C and D, I combine with that dusting device a suspension-strap, E, attached thereto and adapted to fit over the shoulder or shoulders of the person, essentially as indicated in Fig. 2 or 1, and thereby sustain much of the weight of the dusting device and its contents.

To facilitate the discharge of the plaster or other powder from the device having the vessel A b, handle C, centrally over the vessel, and the laterally-extending handle D, I combine therewith a thin open-work or skeleton clearer, F, conformed to and arranged closely over the perforated bottom b and centrally pivoted thereto, and secure one of the two handles C D to the clearer, and the other handle to the vessel A, substantially as shown by Figs. 3, 4, 5, and 6, so that by turning to or fro about the vertical axis of the vessel either one of the two handles C D, while the other is held stationary, the clearer F will be correspondingly turned about its pivot and close over the sieve-like vessel-bottom b, or the latter will be turned under the clearer, so as to thereby in each case cause the plaster or powder to freely pass through the sieve-like bottom during such movements of the vessel or clearer.

In Figs. 2 and 4 and at the right in Figs. 1 and 3 the clearer F is fastened to the pivot-shaft g, to which the rod or handle D is secured, and the handle C is secured to the vessel A, so that the latter will be turned to and fro about the clearer by turning the handle to and fro about the vertical axis of the vessel when the handle D is held stationary, and I generally prefer this construction for use in dusting large plants, because the quick circular turning of the vessel A imparts centrifugal motion to the particles passing through the vessel-bottom, so as to cause them to spread out all around in their descent below the vessel and cover a much larger surface than that of the vessel-bottom, as indicated by dotted lines at w in Figs. 1 and 2.

At the left in Figs. 1 and 3 the lateral rod D is fastened to the vessel A, and the handle C is fastened to the pivot-stem g of the clearer F, so that by turning the handle C to and fro about the stem g, while the handle D is held stationary, the clearer F will be moved to and fro about its pivot in the vessel, so as to thereby discharge the particles through the perforated bottom of the vessel without giving them much lateral motion or causing them to spread much in their descent below the vessel, as indicated by dotted lines at v in Fig. 1.

To produce a device especially suitable for use in simultaneously dusting opposite plants in two parallel rows, I combine with one dusting device, consisting of a sifting-vessel, A b, pivoted clearer F, handle C over the vessel, and lateral thrust-rod D, combined as above described, a second and similar device composed of a second sifting-vessel, A b, pivoted clearer F, and handle C, and secured to the other end of the same rod D, substantially as indicated in Fig. 3, so that a person, in passing along between two rows of plants and grasping the two handles C C, one in each hand, and thereby carrying the device, with the thrust-rod D in front and serving to keep the two vessels at a proper distance apart, substantially as represented in Fig. 1, can then simultaneously or alternately turn each of the two handles of the device to and fro and thereby correspondingly turn the vessel A or clearer F in each duster, and thus cause the simultaneous or alternate discharge of the dust-like substances through the sieve-like bottoms of the two vessels upon opposite plants in the two rows with but little or no endwise movement of the thrust-rod to bring each vessel over the proper row of plants.

In Figs. 1 and 3 the vessel at the right has the handle C fast thereon and the pivoted clearer F fastened to one end of the rod D, while the vessel at the left is fast to the other end of the same rod D and the handle C is fast on the stem g of the clearer. Both the right and the left sifting devices in this double duster can have either of those constructions.

To greatly facilitate carrying and operating the device composed of the two sifting devices united to the one thrust-rod D, as above described, I combine therewith the suspension-strap E, secured thereto, and adapted to fit about the neck and shoulders of the person, so as to thereby sustain most of the weight of the double dusting device and its contents; and in this case I prefer to have the strap attached to the device at or near the ends of the rod D, substantially as shown in Fig. 1, although the strap E can be secured by any suitable known means to the middle or other part of the rod.

The handle or rod D can be secured to one or two of the sifters by any suitable means; but I commonly prefer to have the large part of that rod or handle formed with a socket in each end, and each sifter furnished with a shank or stem, h, fitting in and removable from such socket. I commonly prefer to have the shank h in the form of an extension of the clearer-stem g laterally between the top of the vessel A and the handle C. By having the rod or handle D secured to the clearer F by a stem extending under the vessel, as indicated by dotted lines at t in Fig. 3, or by having the support i for the stem g or shank h secured to the vessel A independently of the handle C, the latter can be pivoted or hinged to diametrically-opposite parts of the vessel, like a common bail on a pail; but I commonly prefer to have the handle C fastened rigidly to the vessel when the rod or handle D is secured to the pivoted clearer F, or otherwise pivoted or jointed to the vessel.

To make the same device capable of delivering the plaster or powder upon only a small surface, as is desirable in dusting small corn and potato plants, and also capable of distributing the plaster or powder upon a larger surface, as is important in dusting larger plants, I combine with the vessel A, having the finely-perforated bottom $b$ and the centrally-pivoted clearer F therein, a removable annular plate, J, fitting in the vessel just over the outer portion of the clearer on the perforated bottom, substantially as represented in Figs. 3 and 5, so that thereby the plaster or powder in the vessel is permitted to pass through the inner part and is prevented from passing through the outer portion of the clearer and perforated bottom, and so that upon removing the annular plate J the plaster or powder will be allowed to pass through the whole extent of the perforated bottom.

By having the duster furnished with two or more removable annular plates, J, of different internal diameters, the size of the dust-outlet through the perforated bottom can be correspondingly varied to best suit plants of as many different sizes. In Figs. 5, 7, and 8 the plate J, which is preferably of sheet metal, is shown divided radially at $s$, so that the end parts can be sprung laterally, as indicated in Fig. 8, to permit the ready insertion and removal of the annular plate past the stem $g$ of the clearer. In case the stem of the clearer shall extend only from under the vessel, as indicated at $t$ in Fig. 3, the ring-plate J need not be divided radially.

To make the centrally-pivoted skeleton clearer F sufficiently strong and durable, and so that it can be very easily turned to and fro in the vessel A, or the vessel easily turned to and fro about the clearer when the vessel is full of heavy ground plaster, and at the same time effectually prevent the packing of the gypsum in the vessel and against the perforated bottom $b$, and insure the free sifting out of the plaster through that bottom, I construct the clearer with very thin, flat, or blade-like radial arms or parts $k$, all united at their inner ends to the pivot-stem $g$, and also all united at or toward their outer ends by a concentric strengthening ring or rim, $l$, to the turning of which to and fro the plaster cannot present much resistance, and by which ring or rim all retarding strain upon any one of the parts $k$ is communicated and distributed to all the others.

In the clearer shown in Figs. 3, 5, 6, and 9, the parts $k$ consist of strips of thin sheet metal soldered together at their inner ends to a hub on the stem $g$ and toward their outer ends to the wire-ring $l$. In the clearer shown in Figs. 4 and 5 the parts $k$ are all in one and the same piece of thin sheet metal, which is left with a solid inner part secured to the stem $g$, and with a continuous outer rim portion, $l$, which can be stiffened and strengthened by turning it closely over a wire ring.

Some sifting devices have heretofore had a vessel formed with a finely-perforated or sieve-like bottom, and furnished with a centrally-pivoted clearer having radial arms arranged close over the sieve-like bottom and secured to a crank-shaft extending above the vessel, and with a lateral handle fastened rigidly to the vessel, so that a person could support the vessel by the lateral handle in one hand and turn the crank-shaft and clearer by the other hand.

What I claim as my invention is—

1. In a plant-duster, the combination, with a vessel having a reticulated bottom and with a clearer pivoted upon or above the same, of a handle and a thrust-rod connected above with said vessel and clearer, whereby the discharge of the material will not be obstructed by said thrust-rod, substantially as specified.

2. In combination with and attached to the upper part of a plant-dusting device, a thrust-rod arranged horizontally, whereby the discharge of material will not be obstructed, and an additional vessel may be attached to the opposite extremity, the whole being suitably supported by a strap, substantially as shown.

3. In combination with the vessel A, having the reticulated bottom $b$, and with the clearer F, pivoted upon or over said bottom, the removable annular plate J, placed over and covering the outer portions of said clearer and bottom, substantially as and for the purpose shown and described.

In testimony whereof I hereunto set my hand, in the presence of two subscribing witnesses, this 2d day of August, 1879.

JOHN F. EDDY.

Witnesses:
JAMES H. SLADE,
JAMES T. GOODFELLOW.